United States Patent [19]

Guild

[11] 4,036,025
[45] July 19, 1977

[54] COMPOSITE PILE HAVING THE INSIDE DIAMETER OF THE TIP LESS THAN THAT OF THE PILE AND MANDREL FOR DRIVING THE SAME

[76] Inventor: Charles L. Guild, 7 Stone Tower Lane, Barrington, R.I. 02806

[21] Appl. No.: 717,510

[22] Filed: Aug. 25, 1976

Related U.S. Application Data

[63] Continuation-in-part of Ser. No. 629,508, Nov. 6, 1975.

[51] Int. Cl.² .............................................. E02D 7/30
[52] U.S. Cl. ...................................... 61/53.72; 61/53
[58] Field of Search ..................... 61/53.72, 53.7, 53, 61/53.5, 53.52; 242/72 R

[56] References Cited

U.S. PATENT DOCUMENTS

| | | | |
|---|---|---|---|
| 3,418,817 | 12/1968 | Rusche | 61/53.72 X |
| 3,802,207 | 4/1974 | Guild et al. | 61/53.72 |
| 3,913,337 | 10/1975 | Nierjan | 61/53 |

Primary Examiner—Jacob Shapiro

[57] ABSTRACT

A composite pile includes a tubular pile and a reinforced tapered concrete tip having an axial core opening through its larger upper end and of a diameter less than that of the tubular pile and seats at the upper and lower ends of the core. An expansible mandrel for use in driving such tips and the tubular pile connected thereto has a main portion dimensioned for driving engagement with the tubular pile, a tip portion dimensioned for driving engagement with the core of such a tip with its boot end engageable with the lower seat and an intermediate shoulder engageable with the upper seat.

15 Claims, 9 Drawing Figures

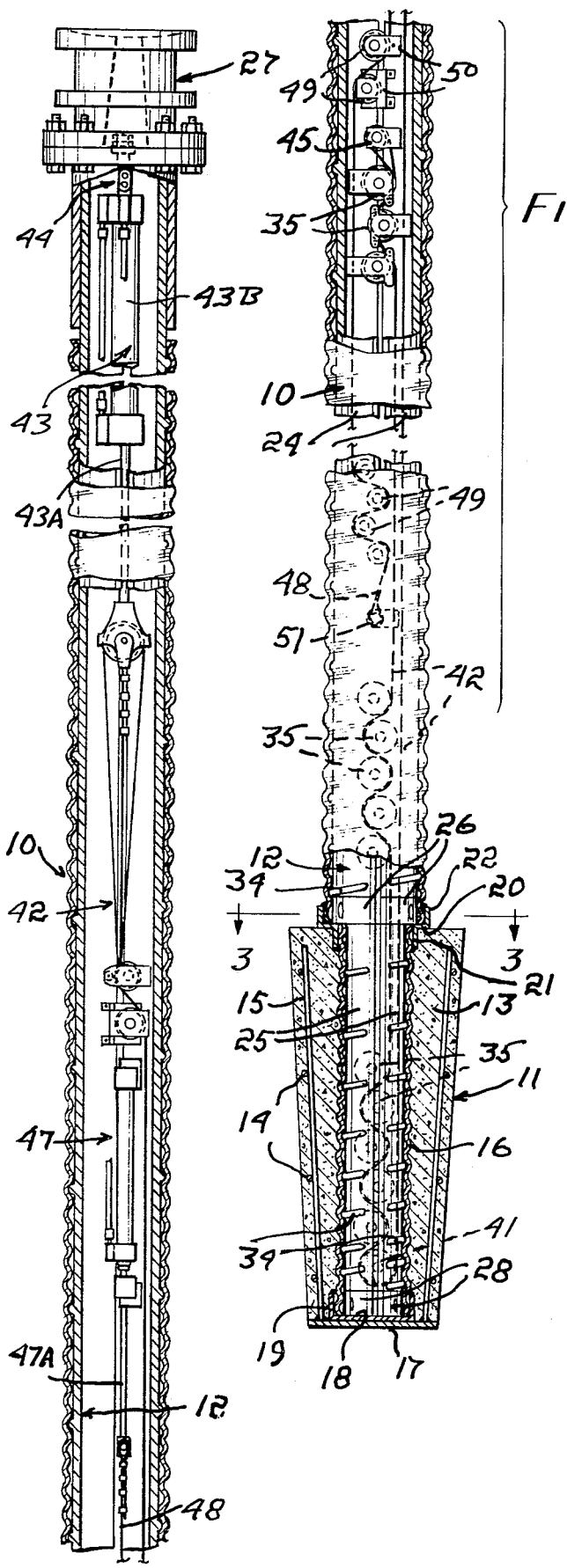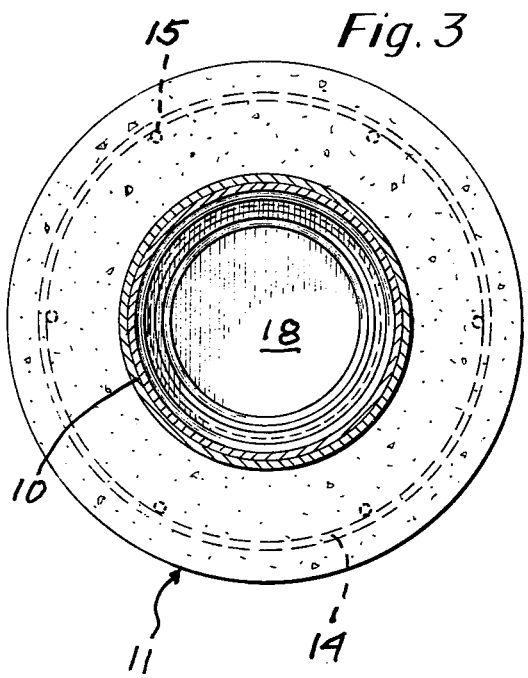

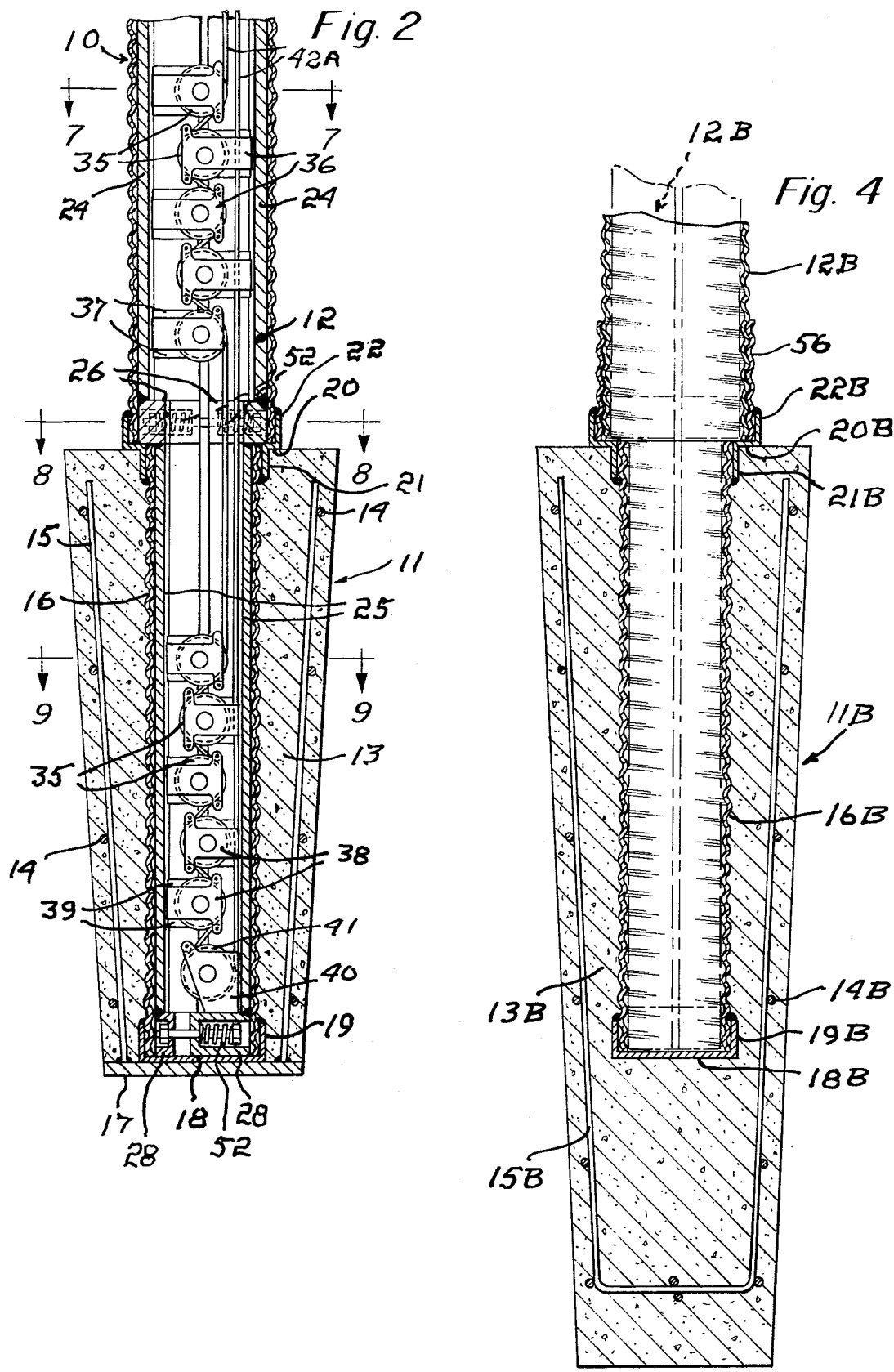

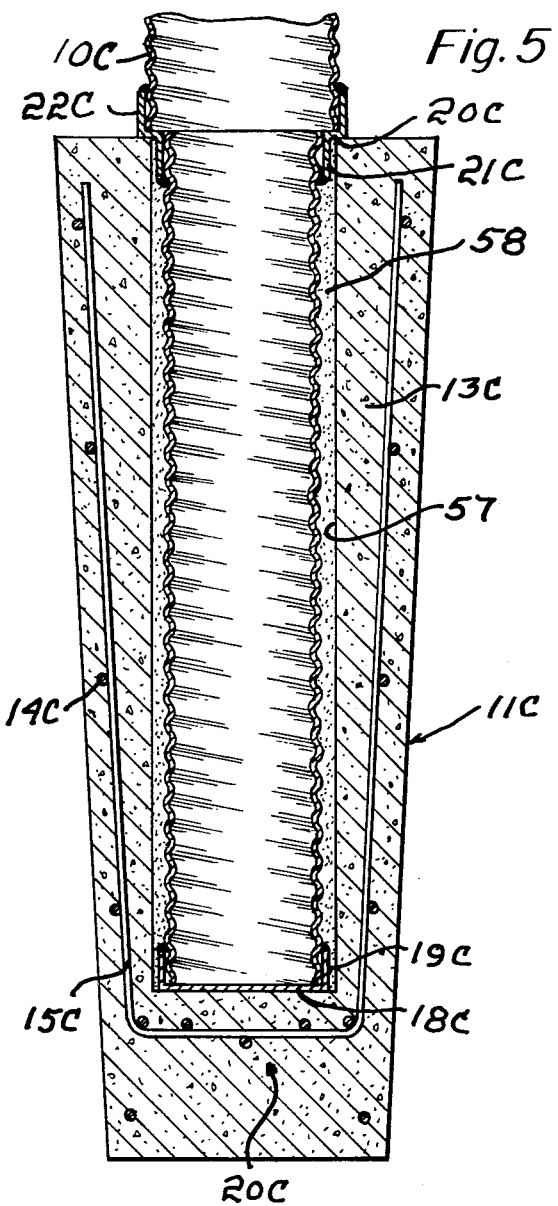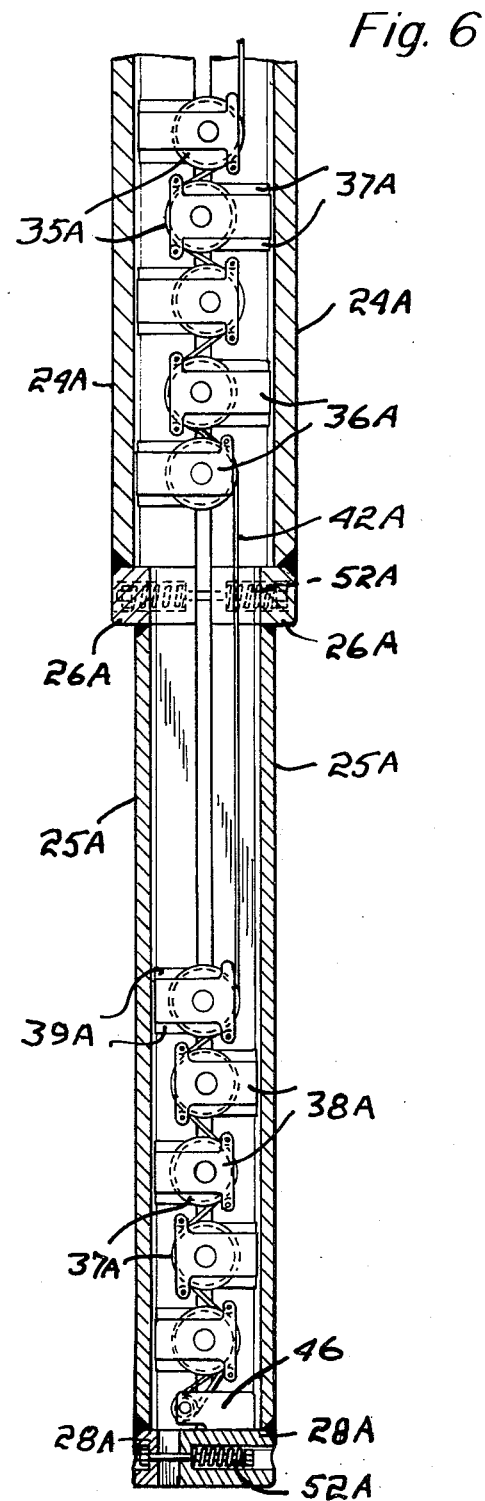

COMPOSITE PILE HAVING THE INSIDE DIAMETER OF THE TIP LESS THAN THAT OF THE PILE AND MANDREL FOR DRIVING THE SAME

The present application is a continuation-in-part of Ser. No. 629,508, filed Nov. 6, 1975.

BACKGROUND REFERENCES

"Construction Methods & Equipment," May 1975, Pages 218, 219, 221, 224.

"The Boston Sunday Globe," May 4, 1958, "M D C Road To Ease Charles Traffic."

"The Boston Sunday Globe," Feb. 21, 1957, "M D C Eliminating Memorial Drive Accident Producing Bottleneck."

U.S. Pat. Nos. 1,778,925, 3,751,931 and 3,875,752.

RELATED APPLICATIONS

"Tapered Pile Tips," Ser. No. 629,508, filed Nov. 6, 1975.

"Expansible Mandrel," Ser. No. 695,259, filed June 11, 1976.

"Composite Pile and Tapered Concrete Tip Therefor" Application Ser. No. 717,510 filed Aug. 25, 1976.

BACKGROUND OF THE INVENTION

The use of tapered, concrete tips having their larger, upper ends of a cross sectional area greater than that of the tubular pile to be driven therewith is often advantageous.

In brief, such tips usually have tapered reinforced concrete bodies and tubular cores incorporated therein dimensioned to receive and be engaged by the mandrel. At the lower end of each core, there is a seat engageable by the boot end of the mandrel and the cores extend a short distance above the larger ends of the tips to facilitate the connection of tubular piles thereto. In driving such composite piles, considerable hammer energy is applied directly against the seat.

THE PRESENT INVENTION

A principal objective of the present invention is to provide tapered reinforced concrete tips that enable hammer energy attendant the driving of composite piles including such tips to be distributed relative to the tips to minimize that applied against their seats, an objective attained with a tip provided with two seats, one at each end of its core, the upper seat surrounding the core and with a mandrel including a main portion dimensioned to fit the tubular pile, a tip portion dimensioned to fit the core of the tip and a shoulder at the junction of the main and tip portions engageable with the upper seat of the tip, the length of the tip portion of the mandrel being such that the boot end thereof then engages the lower seat. As a consequence, the hammer energy applied to the tip is distributed between upper and lower portions thereof. At the same time, the use of a core of a cross sectional area less than that of the tubular pile to which it is connected makes possible greater latitude in the dimensions of the tips relative to their taper and the thickness of the concrete bodies relative to their cores.

Other objectives of the invention are concerned with the construction of the upper seats thereof in order that they may be used with any tapered concrete tip construction, an objective attained with an annular seat including a depending inner sleeve portion dimensioned to receive within it the upper end of the core and an outer sleeve portion dimensioned to receive within it a tubular member that may be the lower end of a pile or a second sleeve portion welded to the first named sleeve portion and dimensioned to receive within it the lower end of a pile, desirably with the pile and the sleeve of corrugated stock.

Other objectives of the invention are concerned with mandrel constructions that ensure maximum gripping force when the mandrel is expanded, an objective attained by providing the tip-entering portion with means by which the mandrel is expanded in addition to mandrel expanding means in the main portion of the pile close to its shoulder, the expanding means preferably of the type including sheaves holding a cable in a sinuous manner such that a pull on the cable that straightens it expands the mandrel and desirably with the sheave arrangement providing that the expanding force exerted within the tip is substantially equal to that applied to the main portion of the mandrel immediately above the shoulder.

BRIEF DESCRIPTION OF THE DRAWINGS

In the accompanying drawings, preferred embodiments of the invention are shown of which:

FIG. 1 is a side elevation of an expansible mandrel and attached composite pile with the pile, tip and mandrel partly broken away and partly sectioned to show certain parts of the operating mechanisms and with the sheave arrangement shown partly in phantom;

FIG. 2 is an enlarged view of the lower part of FIG. 1 with the pile, tip and mandrel sectioned;

FIG. 3 is a section, on an increase in scale, taken approximately along the indicated line 3—3 of FIG. 1;

FIG. 4 is a section taken vertically of the lower part of a composite pile having a tip in accordance with another embodiment of the invention;

FIG. 5 is a like view of yet another tip in accordance with the invention;

FIG. 6 is a longitudinal section of the lower part of an expansible mandrel in accordance with another embodiment of the invention;

THE PREFERRED EMBODIMENTS OF THE INVENTION

Figure 7:
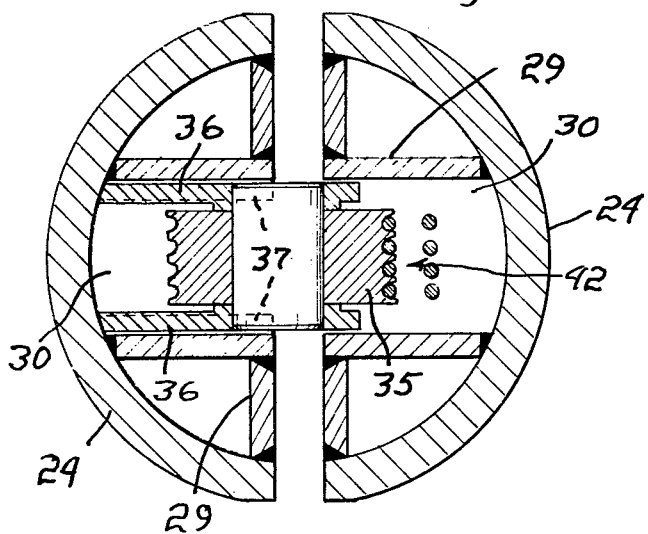
FIG. 7 is a section taken approximately along the indicated line 7—7 of FIG. 2.

In the drawings, a corrugated tubular pile and a tapered, reinforced concrete tip are generally indicated at 10 and 11, respectively, and the expansible mandrel by which the tip and the pile, when interconnected, are driven is generally indicated at 12.

The tip 11, see FIGS. 1 - 3, has a tapered concrete body 13 with a reinforcing assembly incorporated therein, the assembly including a vertically spaced series of circular members 14, each welded to a series of vertically disposed members 15 spaced about a core 16, a length of corrugated tubing of a diameter less than that of the pile 10 and extending from end-to-end of the body 13.

The core 16 is part of an assembly including a steel plate 17 covering the lower, smaller end of the concrete body 13 and welded to the lower ends of the vertically disposed reinforcing members 15 and to a boot 18 establishing a first seat and including a sleeve portion 19 receiving the lower end of the core 16 and welded thereto. The tip 11, as thus far described, is or may be identical to that shown in copending application, Ser. No. 629,508, filed Nov. 6, 1975.

In accordance with the invention, the core assembly includes a second seat 20 surrounding the core 16 and covering an annular portion of the upper larger end of the concrete body 13. The seat 20 is provided with a depending, inner sleeve portion 21 receiving within it the upper end of the core 16 and welded thereto and an outer upwardly disposed sleeve portion 22 of a diameter enabling it to receive within it the lower end of the pile 10 which is welded thereto to complete the composite pile.

By way of example and not by way of limitation, the tip 11 may be in the neighborhood of five feet in length and circular in cross section with its diameter at its upper end about two feet and so tapering that the diameter of its smaller lower end is about 18 inches. The pile 10, in the disclosed embodiment, may be 14 inches in diameter and that of the core ten inches. It will be appreciated that the use of a core smaller in cross section than the pile results in a tip having a thicker concrete wall than it would otherwise have without any change in its external dimensions or enables the tip to have a sharper taper and still have a desired wall thickness.

The expansible mandrel 12 includes arcuate sections each including a main portion 24, a tip portion 25, and an intermediate, arcuate shoulder portion 26. The upper ends of the main portions 24 are interconnected by a drive head 27 and the free ends of the tip portions 25 have boot parts 28.

The mandrel sections are held in a retracted relationship as by means presently to be described and are so dimensioned that the main portions 24 and the tip portions 26 may then be entered within the pile 10 and the core 16 with the shoulder portions 26 resting against the upper seat 20 and the length of the tip portions 25 such that the boot parts 28 then rest against the lower seat 18.

Means presently to be described are provided to force the mandrel sections apart with the main portions 24 dimensioned then to grip the interior of the pile 10 and the tip portions 25 of an appropriately shorter radius for the like gripping of the interior of the core 16 when the mandrel is expanded by such means, the lower ends of the main portions 24 welded to the upper surface of the shoulder portions 26 and the upper ends of the tip portions 25 welded to the undersurface thereof in positions in which each is concentric with the appropriate one of the main portions 24. Both the expansion and the contraction means are under the control of power operated units shown as fluid pressure operated, piston-cylinder units.

In the disclosed mandrel construction, the mandrel portions 24 have lengthwise reinforcements 29 of right angular section welded thereto and spaced apart to establish a lengthwise channel 30 and each tip portion 25 has similar reinforcements 31 welded thereto and providing a lengthwise channel 32, each channel 32 in vertical alignment with the appropriate one of the channels 30. Each shoulder portion 26, which is of substantial thickness, has an open-ended slot 33 of the same width as and effecting communication between aligned channels and shown as of the same size and shape as the channels 32.

Where the tubular pile 10 and the core 16 of the tapered tip 11 are of corrugated stock both portions of the mandrel 12 are desirably provided with ribs 34 (shown only in FIG. 1) disposed and dimensioned as required for entry into channels established by the corrugations of such stock.

Turning first to the means by which the illustrated mandrel is expanded to establish the pile and core-gripping relationship of its sections, sets of sheave 35 are spaced lengthwise of the mandrel portions of each arcuate section with each section having sheaves connected thereto in the same manner as that shown and described in U.S. Pat. No. 3,779,026 and said application Ser. No. 695,259. In brief, in the case of each mandrel portion 24, sheave mounts 36 are slidably confined in its channel 30 against movement lengthwise thereof by pairs of bars 37 welded to the channel defining reinforcements 29 of that section. In the case of the mandrel portions 25, the sheaves are supported in the same manner but with the mounts 38 and pairs of bars 39 appropriately shorter. In both cases, the sheaves and their mounts protrude from the mandrel portion to which they are connected into the channel of the opposite mandrel portion.

One boot part 28 is provided with a mount 40 for a turning sheave 41 and the expansion cable 42 is connected to the stem 43A of a fluid pressure operated piston-cylinder unit 43 the cylinder 43B of which is connected to the head 27 by any suitable means such as are generally indicated at 44. The expansion cable 42 extends downwardly through a channel 30, a slot 33, and the aligned channel 32, about the turning sheave 41, upwardly and in trained engagement with the sheaves 35 in the manner shown and secured to an anchor 45. Thus, when the unit 43 is operated to retract its stem 43A, a straightening pull is exerted on the cable 42 forcing the sheaves 35 and accordingly, the mandrel sections apart into their pile and core-grinding relationships.

An alternate arrangement of the expansion cable is illustrated in FIG. 6 in which corresponding parts are distinguished by the suffix addition A to the appropriate reference numerals. With the expansion means therein illustrated, the turning sheave 41 and its mount 40 are replaced by an anchor 46 and the expansion cable 42A has one end connected to a piston-cylinder unit, not shown, operable to effect a straightening pull thereon, and extending downwardly in trained engagement with the sheaves 35A in the manner shown with its other end secured to the anchor 46.

While the sheaves, their connections with the mandrel sections, the cables and their disposition and the mounting of the operating units are more fully described in the above referred to patents and application, it is important to note that it is a practical necessity that the maximum expanding force is applied in the lower or boot end of the mandrel.

In accordance with the present invention, a set of sheaves 35, 35A is carried by the tip portions 25, 25A of the mandrel and another set of sheaves is carried by the main portions 24, 24A above but adjacent the shoulder portions 26, 26A to ensure that the pile tips and the piles are securely locked to the mandrel 12, 12A. Both of said sheave sets are shown as including the same number of sheaves. It will be understood that, in practice, other sets of sheaves are spaced lengthwise of the mandrel to ensure the proper distribution of the expanding force and that the number of sheaves typically decreases in the sheave sets toward the head end of the mandrel.

The secure interlock thus attained, while ensuring the best possible driving relationship between the mandrel and the composite pile, creates the problem of ensuring the release of the mandrel from the driven pile. While resilient means are of use, positive disengagement can be best secured by a separate sheave-cable-power operated unit combination to force the release of the mandrel sections from the pile and tip and to ensure their return into their pile-entering relationhip. Resilient connections spaced lengthwise of the mandrel serve both to assist in the release of the mandrel sections and to hold them in their pile-entering relationship when neither power operated unit is in use.

For that reason, the retraction means of the type shown in said application Ser. No. 695,259 are herein briefly described to minimize the necessity of reference thereto, see FIGS. 1 and 2. A second fluid pressure operated unit 47 is secured to one mandrel portion 24 below the unit 43 and the retraction cable 48 is secured to the end of its stem 47A and is trained through several series of retraction sheaves 49, the mounts 50 of which are alternately connected to one or the other of the mandrel sections 24, with the end of the cable 48 secured by an anchor 51 fixed in one mandrel section. It will be seen that the disposition of the cable 48 relative to the sheaves 49 is such that a straightening pull on it, draws the sheaves 48 and accordingly the mandrel sections towards each other.

Figure 8:
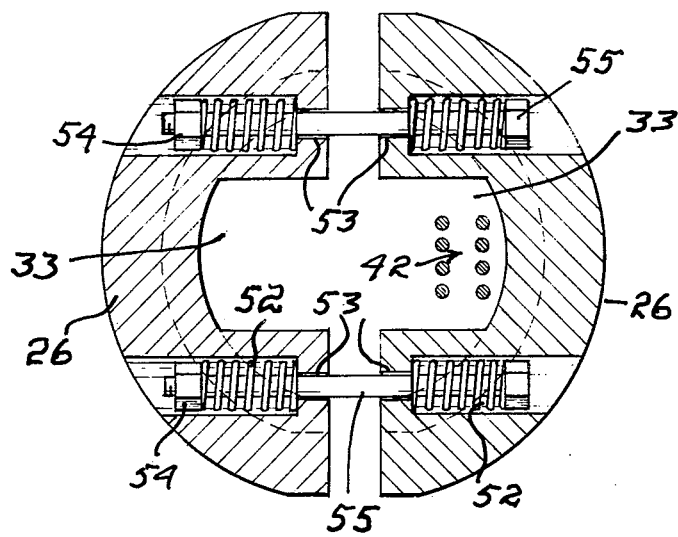
FIG. 8 is a section taken approximately along the indicated 8—8 of FIG. 2.
Figure 9:
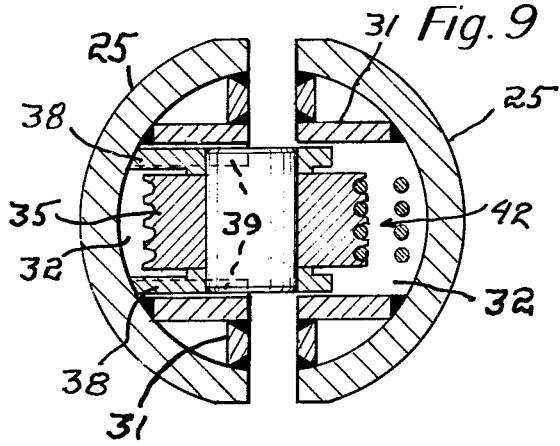
FIG. 9 is a section taken approximately along the indicated line 9—9 of FIG. 2.

In practice, the boot parts 28, the mandrel sections 24, and the shoulder portions 26 are connected by retraction springs. A typical arrangement of such springs 52 is shown in FIG. 8 in which the shoulder portions 26 are shown as having transversely aligned bores 53 at both sides of their slots 33 with counterbores at their outer ends receiving nuts 54 on the ends of bolts 55 extending through the bores 53 and holding the compression, retraction springs 52 seated in the counterbores and yieldably urging the mandrel sections towards each other.

It will be appreciated that such a mandrel may be used with tapered concrete tips of various types provided that the distance between the seats at the lower and upper ends of their cores is the same if the advantages of two seat driving are to be realized.

Insofar as the tip illustrated by FIG. 4 is identical to that previously described, it is not again detailed and corresponding parts are distinguished by the suffix addition B to the appropriate reference numerals. In this embodiment of the invention, the seat 20B of the tip 11B is of a diameter large enough to receive within it a short length 56 of corrugated tubing which is welded thereto. The diameter of the tubing 56 is such as to enable the bottom end of the pile 10B, also of corrugated stock, to be threaded therein and connected thereby by a weld or sealed with a suitable mastic.

The tip 11B is enough longer than the tip 11 so that its core 16B, which is of the same length as the core 16, extends only through the major portion thereof, two-thirds of its length for one example, thus providing a concrete seat portion of a thickness adequately reinforcing the seat 18B in place of the end plate 17.

Another tapered concrete tip in which the lower seat is not at the bottom thereof is illustrated by FIG. 5 and as the construction is generally similar to that of the tips 11 and 11B, the same reference numerals are employed to designate corresponding parts but these are distinguished by the suffix addition C. It will be seen that the length of the concrete body 13C is less than that of the tip 11C and is of the type detailed in copending application Ser. No. 629,508 with an axial passage 57 formed in the body 13C extending about five-sixths of the way therethrough with the layer of reinforced concrete below the passage 57, the seat 20B. The passage 57 is dimensioned freely to receive the tubular core 16C with the resulting annular space filled with a packing 58, sand, cement grout, or epoxy cement.

From the foregoing, it will be apparent that in all cases, the driving energy imparted to the tip while the composite pile is being driven is distributed between upper and lower portions thereof.

I claim:

1. A composite pile and an expansible mandrel for driving said pile, said composite pile including a tubular pile and a tapered concrete tip consisting of a reinforced concrete body, a centrally located core incorporated therein and opening through its larger, upper end and of a diameter less than that of said tubular pile, a seat adjacent each end of said core, and an upwardly disposed sleeve portion exposing the upper seat and to which the lower end of said pile is connected, and said mandrel including sections, a head interconnecting said sections, means within said mandrel operable to effect an expanded, pile-gripping relationship of said sections, means within said mandrel operable to effect the retracted, pile-entering relationship thereof, each section including a main portion, a tip portion, and an intermediate shoulder portion, said main and tip portions dimensioned for driving engagement with the interior of said pile and the core, respectively, and the tip portions of a length such as to enable the bottom end of the tip and shoulder portions to engage simultaneously the lower the upper seats, respectively, of said tapered concrete tip.

2. A tip for attachment to a tubular pile and then to be driven therewith by means of an expansible mandrel the sections of which have main portions for driving engagement with the interior of the pile, tip portions of smaller diameter, and shoulders between said portions, said pile tip including a tapered, reinforced concrete body and a centrally located, upwardly opening core dimensioned to receive the tip portions of said mandrel and extending at least part way through the body from the larger upper end thereof, said tip also including a first seat at the lower end of said core engageable by the ends of the tip portions of the mandrel, a second seat surrounding the upper end of said core engageable by the shoulder portions of the mandrel and an upwardly disposed sleeve portion dimensioned to enable said tubular pile to be secured thereto.

3. The tip of claim 2 in which the second, upper seat includes an inner, downwardly disposed sleeve portion secured to the core and said outer upwardly disposed sleeve portion.

4. The tip of claim 3 in which the first seat is a plate at the bottom end of the core.

5. The tip of claim 3 in which the core extends part way through the concrete body and the second seat is the layer of concrete between the bottom of the core and the lower end of the tip.

6. The tip of claim 4 in which the core extends all the way through the tip, the plate is the bottom of the tip and is welded to the reinforcement thereof.

7. The tip of claim 3 in which a second sleeve portion of substantial axial extent and dimensioned to receive the lower end of the pile fits within and is secured to the upwardly disposed sleeve portion of the second seat.

8. The tip portion of claim 7 in which the second sleeve portion and the pile are of corrugated stock, the lower pile end is threaded in the second sleeve portion and a mastic seals the thus established threaded joint.

9. An expansible mandrel for use in driving a tubular pile having a tip attached thereto having a central, upwardly opening core provided with a seat at each end thereof and an upwardly disposed sleeve portion of cross sectional area larger than the core to which the pile is connected and within which the seats are exposed, said mandrel including lengthwise sections, a head interconnecting the upper ends of the sections, each section including a main portion for driving engagement with the interior of the pile, the tip portion of smaller cross section for driving engagement with the core, and an intermediate portion connecting said main and tip portions and establishing an outwardly projecting shoulder engageable with the upper seat of the pile tip, the length of the tip portions being coextensive with that of the core of the pile tip and each tip portion including at its lower ends, a boot portion engageable with the lower seat of the pile tip, expanding means within said mandrel operable to force the appropriate mandrel sections into their pile and core-gripping relationship and means operable to return said sections into their retracted position in which the pile and core are released.

10. The expansible mandrel of claim 9 in which the expanding means includes units above and below said shoulder-establishing section.

11. The expansible mandrel of claim 10 in which said units are both substantially equal as to expanding force they are capable of applying.

12. The expansible mandrel of claim 9 in which the expanding means includes sheaves, some carried by one section and others by the other section and a cable in trained engagement with all said sheaves and held in a sinuous manner such that a pull on the cable forces the sheaves and accordingly the mandrel sections apart, the sheaves arranged in series spaced lengthwise of the mandrel, one series of sheaves carried by the tip portion and another series carried by the main portion close to the shoulder-establishing portions.

13. The expansible mandrel of claim 12 in which the series carried by the trip portion and the series carried by the main portion closest thereto contain the same number of sheaves.

14. The expansible mandrel of claim 9 in which the mandrel sections are arcuate and each shoulder-establishing portion is dimensioned to enable main and tip portions to be welded thereto in a concentric relationship.

15. The expansible mandrel of claim 14 and resilient retracting means interconnecting said shoulder-establishing portions.

* * * * *